United States Patent [19]
Utagawa

[11] Patent Number: 5,373,342
[45] Date of Patent: Dec. 13, 1994

[54] FOCUS DETECTION APPARATUS

[75] Inventor: Ken Utagawa, Yokohama, Japan

[73] Assignee: Nikon Corporation, Tokyo, Japan

[21] Appl. No.: 197,448

[22] Filed: Feb. 16, 1994

Related U.S. Application Data

[63] Continuation of Ser. No. 38,070, Mar. 29, 1993, abandoned, which is a continuation of Ser. No. 765,318, Sep. 25, 1991, abandoned.

[30] Foreign Application Priority Data

Oct. 1, 1990 [JP] Japan ................................ 2-263393
Mar. 18, 1991 [JP] Japan ................................ 3-78952

[51] Int. Cl.$^5$ ............................................. G03B 13/36
[52] U.S. Cl. ................................. 354/402; 354/406
[58] Field of Search ............... 354/402, 404, 406, 407, 354/408

[56] References Cited

U.S. PATENT DOCUMENTS

| | | | |
|---|---|---|---|
| Re. 30,099 | 9/1979 | Hosoe et al. | 354/404 |
| Re. 31,370 | 9/1983 | Mashimo et al. | 354/402 |
| 3,723,003 | 3/1973 | Vockenhuber et al. | 354/404 |
| 4,047,187 | 9/1977 | Mashimo et al. | 354/402 |
| 4,740,676 | 4/1988 | Satoh et al. | 354/403 |
| 4,768,052 | 8/1988 | Hamada et al. | 354/402 |
| 4,903,065 | 2/1990 | Taniguchi et al. | 354/402 |
| 4,904,854 | 2/1990 | Ishida et al. | 250/201 |
| 4,949,116 | 8/1990 | Karasaki et al. | 354/408 |
| 4,954,701 | 9/1990 | Suzuki et al. | 354/406 |

FOREIGN PATENT DOCUMENTS

| | | |
|---|---|---|
| 0351855 | 1/1990 | European Pat. Off. |
| 3803305 | 8/1988 | Germany. |
| 1-120518 | 5/1989 | Japan. |

Primary Examiner—Russell E. Adams
Attorney, Agent, or Firm—Shapiro and Shapiro

[57] ABSTRACT

A focus detection apparatus which can precisely perform focus detection for phototaking lenses having various exit pupil positions even when a position separated from the optical axis of a phototaking lens is set as the center of a focus detection area.

A pair of outputs are selected from those of a plurality of pairs of photoelectric transducer arrays on the basis of pupil position information associated with the exit pupil position of a phototaking lens, and position information associated with the distance between a base line and the optical axis. An arithmetic means detects a relative shift amount of a plurality of pairs of optical images on the basis of the selected pair of focus detection signals, thereby calculating a defocus amount.

21 Claims, 15 Drawing Sheets

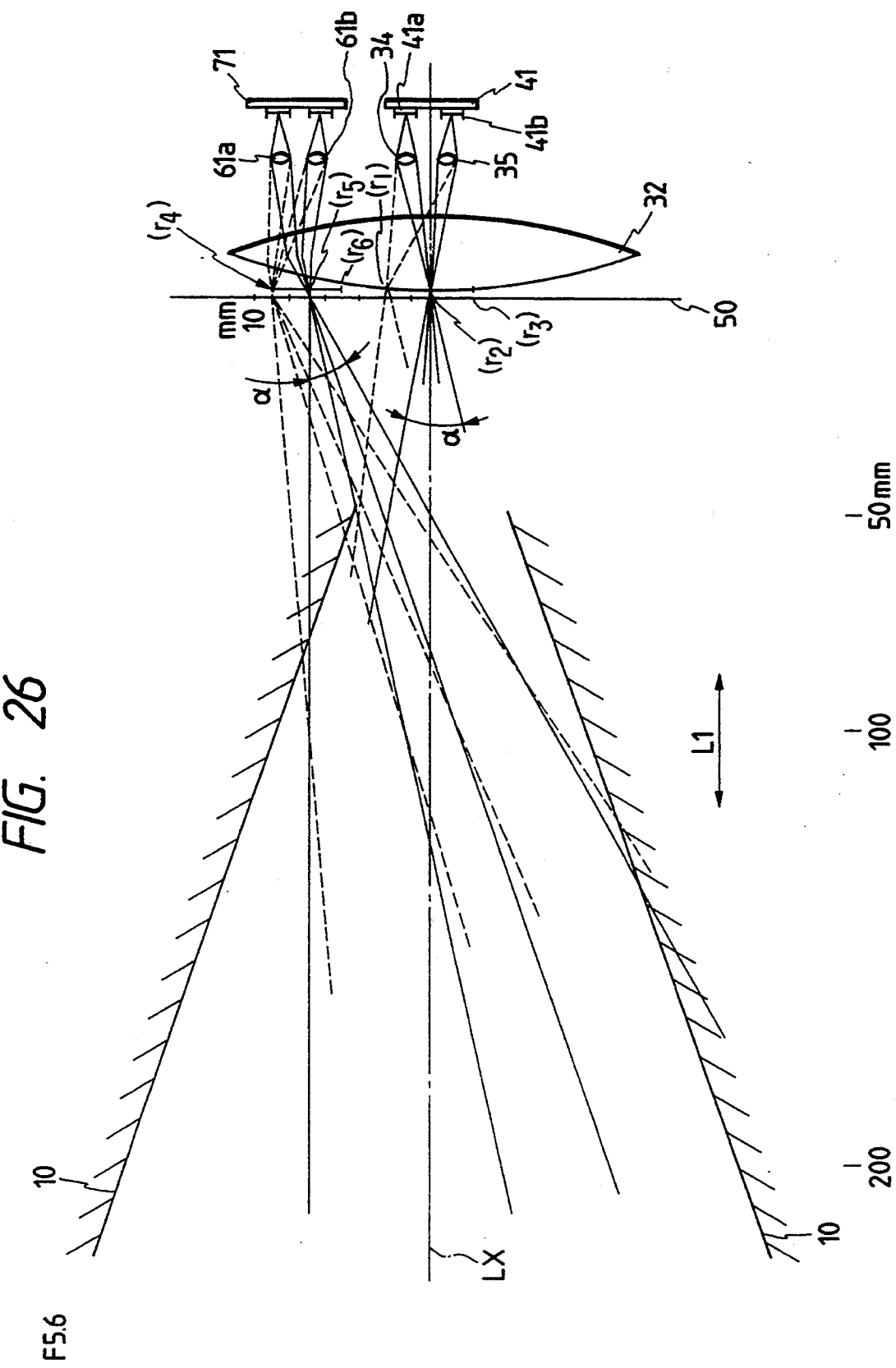

FOCUS DETECTION APPARATUS

This is a continuation of application Ser. No. 038,070 filed Mar. 29, 1993, which is a continuation of application Ser. No. 765,318 filed Sep. 25, 1991, both now abandoned.

BACKGROUND OF THE INVENTION

1. Field of the Invention

The present invention relates to a focus detection apparatus for, e.g., a camera.

2. Related Background Art

As a conventional focus detection system in a single-lens reflex camera, a phase difference detection system is known. This system will be explained below with reference to FIG. 25.

A light beam incident through an area 21a of a phototaking lens 21 is focused on a photoelectric transducer array 41a via a field mask 31, a field lens 32, an aperture stop portion 33a, and a re-focusing lens 34. Similarly, a light beam incident through an area 21b of the phototaking lens 21 is focused on a photoelectric transducer array 41b via the field mask 31, the field lens 32, an aperture stop portion 33b, and a re-focusing lens 35.

In a so-called near-focus state wherein the phototaking lens 21 forms a sharp image of an object before a prospective focal plane, a pair of object images focused on the photoelectric transducer arrays 41a and 41b are separated away from each other. Contrary to this, in a so-called far-focus state wherein the phototaking lens 21 forms a sharp image of an object after the prospective focal plane, the pair of object images approach each other. In a so-called in-focus state wherein the phototaking lens forms a sharp image of an object on the prospective focal plane, the object images on the photoelectric transducer arrays 41a and 41b coincide with each other. Therefore, the pair of object images are photoelectrically converted into electrical signals by the photoelectric transducer arrays 41a and 41b, and the converted signals are subjected to arithmetic processing by a microcomputer (not shown) so as to obtain the relative position of the pair of object images. Thus, a focusing state, in this case, a shift amount from the in-focus state, and a shift direction (to be referred to as a defocus amount DF hereinafter), can be obtained.

In a conventional apparatus of this type, as shown in FIG. 26, areas ($r_1$) to ($r_3$) of about $\pm 2$ to $\pm 3$ mm having the position ($r_2$) intersecting an optical axis LX of the phototaking lens as the center on a focus detection plane 50 are used as focus detection areas, and images within this range are focused on the photoelectric transducer arrays 41a and 41b on an IC board 41 using the pair of re-focusing lenses 34 and 35. A relative image shift amount is detected based on image outputs from the two photoelectric transducer arrays 41a and 41b, thus performing focus detection.

A focus detection apparatus of a single-lens reflex camera must prevent vignetting (eclipse) in a focus detection optical system even for an exchangeable lens having a full-open f-number of about F5.6. In most cases, the exit pupil position of an F5.6 phototaking lens is present somewhere in a range of about 50 mm to 200 mm indicated by hatching. Thus, a spread $\alpha$ of a detection light beam must be set to be about F7 so as to prevent vignetting in an F5.6 lens which has an exit pupil position within this range.

When the apertures of the re-focusing lenses 34 and 35 are projected at the exit pupil position of about 100 mm (a range L1 in FIG. 26) by the field lens 32, light beam components (broken lines) passing through points ($r_1$) and ($r_3$) having an image height of 2 to 3 mm from the optical axis can be subjected to focus detection without causing vignetting for an F5.6 lens having an exit pupil position of 50 mm to 200 mm. With this structure, in a conventional focus detection apparatus, focus detection free from vignetting can be performed within a range of an image height of about 3 mm.

In some cases, focus detection must be performed using areas ($r_4$), ($r_5$), and ($r_6$) separated from the center of the optical axis by 3 to 4 mm or more as focus detection areas. Thus, re-focusing lenses 61a and 61b, and an IC board 71 are arranged, as shown in FIG. 26, so as to define the positions ($r_4$), ($r_5$), and ($r_6$) having the point ($r_5$) of an image height of 7 mm as the center as focus detection areas. In this case, this focus detection optical system is constituted, so that the apertures of the re-focusing lenses 61a and 61b form conjugate images at the exit pupil position of about 100 mm by the field lens 32. As can be apparent from FIG. 26, when an F5.6 phototaking lens is used for the focus detection areas ($r_4$), ($r_5$), and ($r_6$), vignetting can be prevented only when the exit pupil position of the phototaking lens falls within the range L1 of about 100 mm. Therefore, an exchangeable lens which can be used is limited, thus posing many problems in practical use.

SUMMARY OF THE INVENTION

It is an object of the present invention to provide a focus detection apparatus which can precisely perform focus detection for phototaking lenses having various exit pupil positions even when a position separated from the optical axis of a phototaking lens is set as the center of a focus detection area.

According to the present invention, a pair of outputs are selected from those of a plurality of pairs of photoelectric transducer arrays on the basis of pupil position information associated with the exit pupil position of a phototaking lens, and position information associated with the distance between a base line and the optical axis. An arithmetic means detects a relative shift amount of a plurality of pairs of optical images on the basis of the selected pair of focus detection signals, thereby calculating a defocus amount.

The focus detection apparatus of the present invention detects the presence/absence of vignetting in each of a plurality of focus detection areas outside the optical axis, and if a plurality of areas free from vignetting are detected, the apparatus performs focus detection calculations on the basis of focus detection signals of the plurality of areas.

According to the present invention, a pair of photoelectric transducer arrays are arranged on each of a plurality of base lines extending from the optical axis of a phototaking lens to different positions in a direction perpendicular to an image shift detection direction, and the photoelectric transducer array pair to be selected is determined in accordance with the heights of the photoelectric transducer array pairs (base lines) and the exit pupil position of the phototaking lens. Therefore, focus detection free from vignetting can be performed for areas separated from the optical axis of the phototaking lens in a direction perpendicular to the image shift detection direction.

BRIEF DESCRIPTION OF THE DRAWINGS

FIG. 26 is a view for explaining a range which can be subjected to focus detection by a conventional focus detection module.

DESCRIPTION OF THE PREFERRED EMBODIMENTS

First Embodiment

A focus detection apparatus according to the first embodiment of the present invention will now be described with reference to FIGS. 1 to 11.

Figure 1:
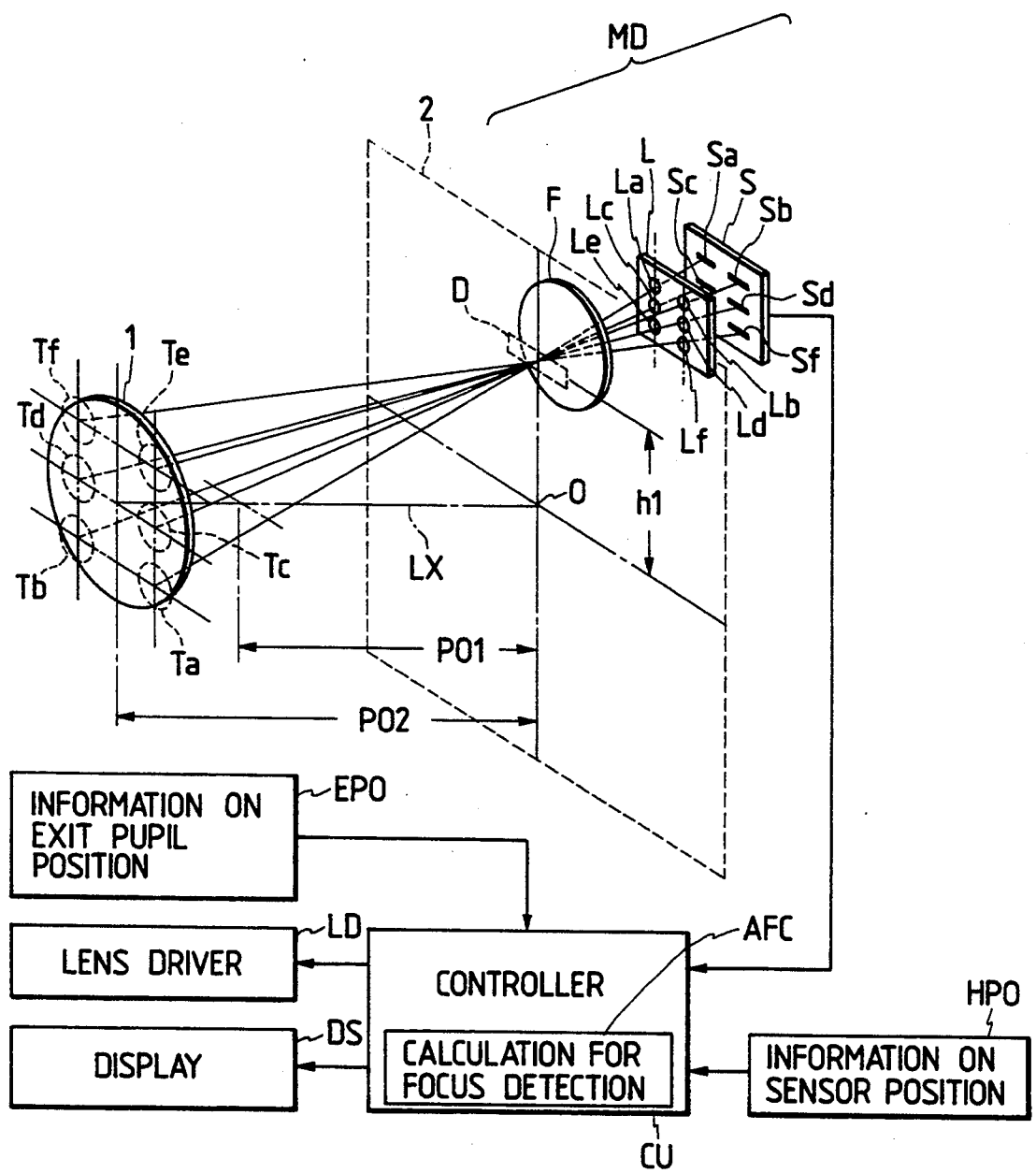
FIG. 1 is a schematic diagram showing the overall structure of the present invention.

FIG. 1 shows the principle of the present invention. A plurality of light components incident through a plurality of areas of a phototaking lens 1 located at an exit pupil position PO2 are respectively focused on a focus detection plane 2, and are then incident on a focus detection module MD (to be described later) to be refocused on photoelectric transducer arrays of the module MD, thereby performing focus detection for each light component.

Figure 2:
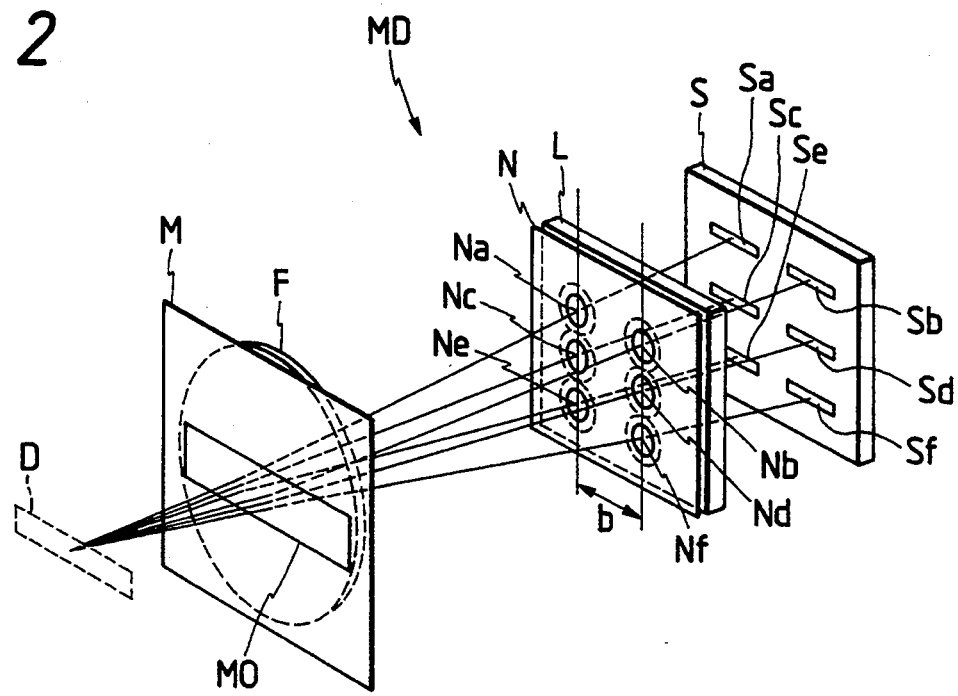
FIG. 2 is a perspective view showing in detail a focus detection module.

As shown in detail in FIG. 2, the focus detection module MD is constituted by an IC board S on which a plurality of photoelectric transducer arrays Sa, Sb, Sc, Sd, Se, and Sf are arranged on a plane conjugate with the focus detection plane 2, a lens board L having re-focusing lenses La, Lb, Lc, Ld, Le, and Lf for focusing optical images passing through areas Ta, Tb, Tc, Td, Te, and Tf of the phototaking lens 1 on the corresponding photoelectric transducer arrays, a stop board N arranged in front of the lens board L, and having aperture stops Na, Nb, Nc, Nd, Ne, and Nf opposing the corresponding re-focusing lenses, a field lens F for projecting optical images formed on the focus detection plane 2 via the respective areas of the phototaking lens 1 onto the photoelectric transducer arrays via the corresponding re-focusing lenses, and a field mask M having a rectangular opening MO so as to prevent unnecessary light components from becoming incident on the photoelectric transducer arrays. In FIG. 2, a projection area of the opening MO on the focus detection plane 2 is indicated by D.

As can be seen from FIG. 1, light components passing through the areas Ta and Tb set on the lower portion of the phototaking lens 1 are focused on the photoelectric transducer arrays Sa and Sb by the re-focusing lenses La and Lb, light components passing through the areas Tc and Td set slightly above the areas Ta and Tb are focused on the photoelectric transducer arrays Sc and Sd by the re-focusing lenses Lc and Ld, and light components passing through the areas Te and Tf set slightly above the areas Tc and Td are focused on the photoelectric transducer arrays Se and Sf by the re-focusing lenses Le and Lf. In this specification, pairs of photoelectric transducer arrays Sa and Sb, Sc and Sd, and Se and Sf will be respectively referred to as first to third arrays, and are denoted by reference numerals S1 to S3. The positional relationship of the areas Ta to Tf in FIG. 1 relative to the lens pupil aperture is changed depending on the pupil position of a phototaking lens.

Figure 3:
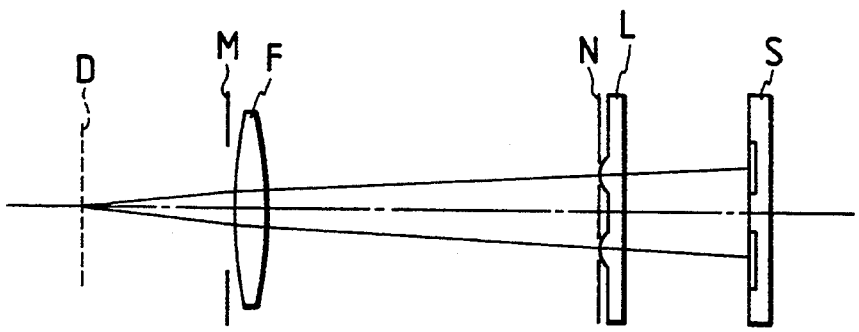
FIGS. 3 and 4 are respectively a plan view and a side view of the focus detection module.
Figure 4:
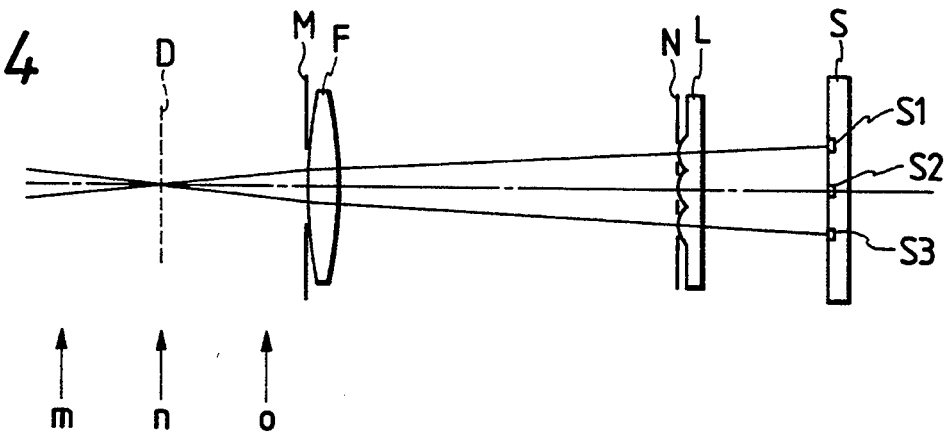
Figure 5A:
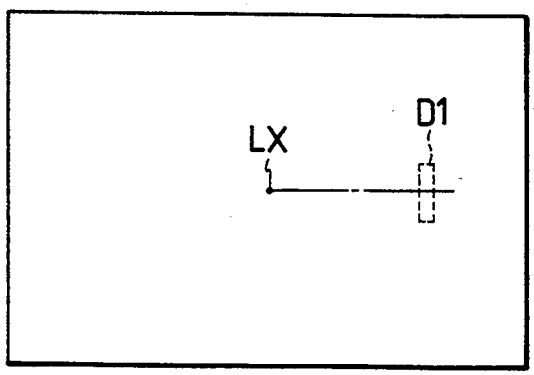
FIGS. 5A and 5B are views showing focus detection areas within a phototaking frame.
Figure 5B:
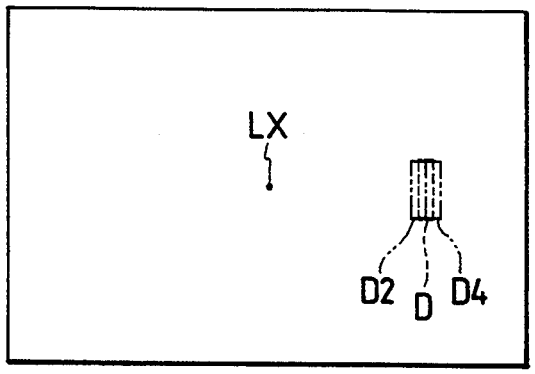

FIGS. 3 and 4 are respectively a plan view and a side view of the focus detection module MD. When the focus detection plane 2 is set at a position indicated by n in FIG. 4, all of the three photoelectric transducer pairs S1 to S3 perform focus detection of an identical focus detection area D1, as shown in FIG. 5A. When the focus detection plane is set at a position m or o, focus detection areas of the pairs are slightly shifted, as indicated by D2 to D4 in FIG. 5B. However, there is no problem in practical use.

Referring back to FIG. 1, a controller CU comprises a CPU, a ROM, a RAM, and other peripheral circuits, and includes a focus detection calculation unit AFC which detects an image shift between the arrays in each photoelectric transducer array pair on the basis of signals from the three photoelectric transducer arrays pairs S1 to S3 so as to obtain a defocus amount from the focus detection plane 2 of the phototaking lens, thereby performing focus detection. A pupil position information generator EPO generates information associated with the exit pupil position of a phototaking lens. The generator EPO generates a value written in advance in a lens ROM in an exchangeable lens in accordance with a focal length, or generates a value according to a focal length which is changed by zooming in a zooming lens. A sensor position information generator HPO generates height information of the focus detection module MD. A phototaking lens driver LD and various displays DS are connected to the controller CU.

For example, when the focus detection apparatus of this embodiment is of a general-purpose type which can be assembled in various cameras having different specifications, the height of the focus detection module MD from the optical axis varies depending on the types of camera. Thus, a correspondence table of exit pupil position ranges which can be subjected to focus detection by the array pairs S1 to S3 in correspondence with the heights of the focus detection module MD is prepared in advance in the ROM, and the height of each camera is input to the controller CU via the sensor position information generator HPO during assembly. When the focus detection module MD is set at a given height, since the exit pupil position ranges of a phototaking lens, which ranges can be subjected to focus detection by the first to third array pairs S1 to S3, are determined accordingly, control is made to select a corresponding condition in accordance with a sensor height signal from the sensor position information generator HPO.

This embodiment will be described in more detail below with reference to FIG. 6.

Figure 6:
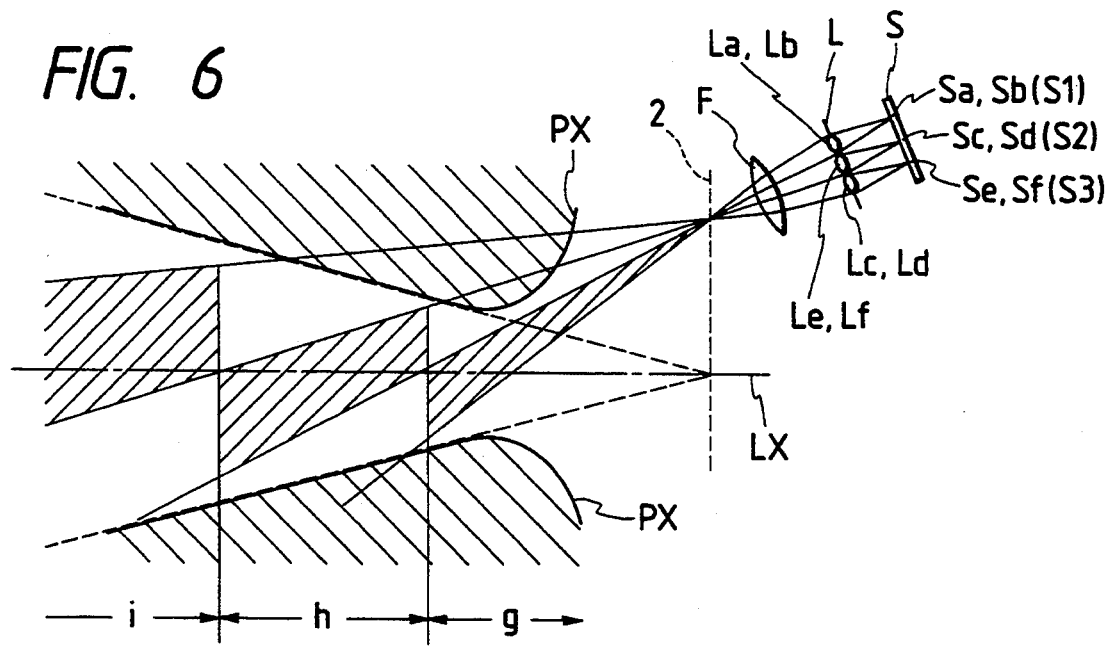
FIG. 6 is a view showing the relationship among exit pupil position ranges which can be subjected to focus detection by first to third photoelectric transducer array pairs.

FIG. 6 shows the exit pupil position ranges in which the three array pairs S1 to S3 can perform focus detection without causing vignetting. In FIG. 6, a spread of light components at the respective exit pupil positions is indicated by PX. Assuming that the focus detection module MD is arranged, as shown in FIG. 6, the first array pair S1 can perform focus detection within an exit pupil position range g without causing vignetting; the second array pair S2, a range h; and the third array pair S3, a range i.

More specifically, when the height of the focus detection module MD is determined, the exit pupil position ranges which allow focus detection by the respective array pairs are determined. Thus, the sensor position information is input to the controller CU via the sensor position information generator HPO to select a correspondence table between the array pairs and the exit pupil positions, and the focus detection module MD can be used as a general-purpose focus detection apparatus.

Figure 7:
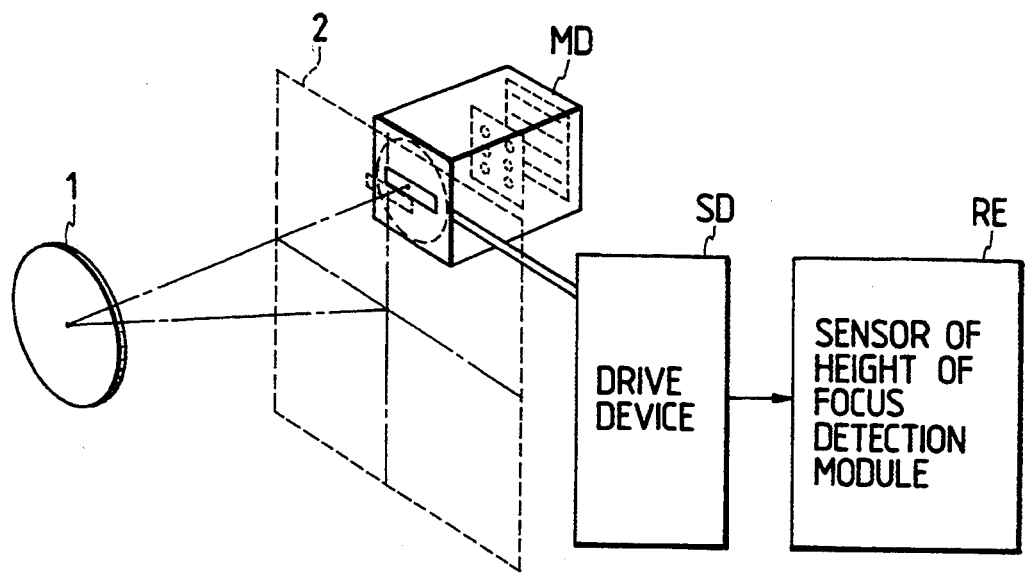
FIG. 7 is a diagram showing an embodiment of a movable focus detection module.

FIG. 7 shows an embodiment wherein the focus detection module MD is moved in a direction perpendicular to an image shift detection direction to be able to adjust the height from the optical axis. A drive device SD drives the focus detection module MD. With this device, a photographer can set the focus detection module MD at an arbitrary position. A sensor RE detects the height of the focus detection module MD, and outputs sensor height information.

The apparatus of this embodiment is suitable for the following use.

A case will be examined below wherein the focus detection module MD is moved toward the optical axis to shift a focus detection area to an area near the optical axis when the focus detection module MD is arranged at the height shown in FIG. 6, and focus detection is performed by the first array pair S1 using a phototaking lens whose exit pupil position is present within the range g. When the exit pupil position at which the array pair S1 can perform focus detection without causing vignetting falls outside the range g upon movement of the focus detection module MD, the focus detection is disabled. In this case, the second or third array pair S2 or S3 is automatically selected in accordance with the height of the focus detection module MD and the exit pupil position, and focus detection of an area near the optical axis can be performed without causing vignetting.

Figure 8:
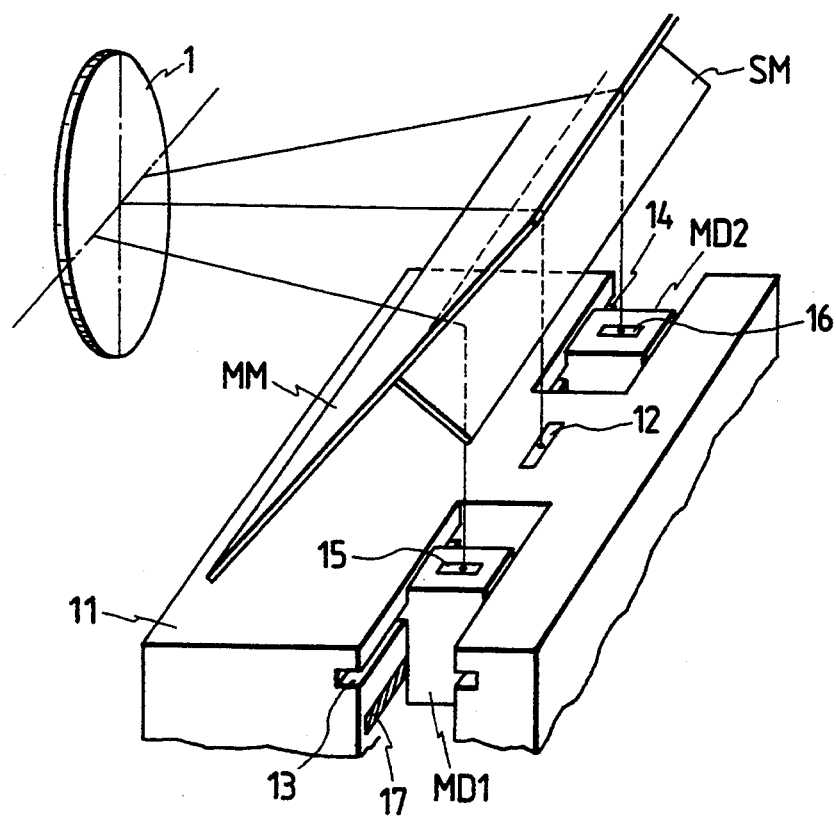
FIG. 8 is a perspective view showing a moving mechanism of the focus detection module.

FIG. 8 shows in detail a movable focus detection module.

An opening 12 for guiding focus detection light components near the optical axis, which components are guided via a main mirror MM and a sub mirror SM, is formed in the central portion of a focus detection module mounting portion 11. Thus, light components passing through the opening 12 are guided onto a pair of photoelectric transducers of a known focus detection module (not shown) arranged in the module mounting portion 11, thereby performing focus detection of an area near the optical axis. On the other hand, grooves 13 and 14 are formed on the two sides of the opening 12, and focus detection modules MD1 and MD2 having the same structure as that shown in FIG. 2 are arranged in the grooves 13 and 14. Openings 15 and 16 for guiding focus detection light components outside the optical axis, which components are guided via the main mirror MM and the sub mirror SM, are respectively formed in the focus detection modules MD1 and MD2. Light components passing through these openings 15 and 16 are guided onto three photoelectric transducer array pairs arranged on the sensor board S in each of the modules MD1 and MD2. Thus, focus detection outside the optical axis is performed.

Figure 9:
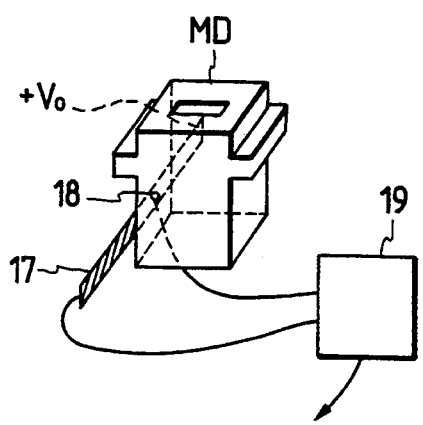
FIG. 9 is a view showing a mechanism for detecting the position of the movable focus detection module.

The positions of the movable focus detection modules MD1 and MD2 are detected, as shown in FIG. 9. More specifically, a slide resistor 17 extends along the groove 13 (14), and a contact 18 contacting the slide resistor 17 is provided to the module MD1 (MD2). Since the resistance between the end portion of the slide resistor 17 and the contact 18 changes according to the module position, a detection circuit 19 reads a voltage value according to the resistance, thereby detecting the position of the module MD1 (MD2).

Assume that, when focus detection of an area near the optical axis is performed on the basis of signals from the pair of photoelectric transducers of the focus detection module (not shown) arranged in the module mounting portion 11, an operator selects the focus detection module MD1 to perform focus detection of an area outside the optical axis, and sets a focus detection area at an arbitrarily desired position. In this case, the detection circuit 19 detects the position of the focus detection module MD1, and the exit pupil position of a phototaking lens is read by the exit pupil position information generator EPO shown in FIG. 1. Based on the position of the focus detection module MD1, an array pair suitable for the read exit pupil position is selected from the three array pairs S1 to S3, and focus detection is performed on the basis of focus detection signals from the selected array pair.

When focus detection using any array pair is disabled, the focus detection module may be moved so that focus detection can be performed by one of the array pairs.

Figure 10:
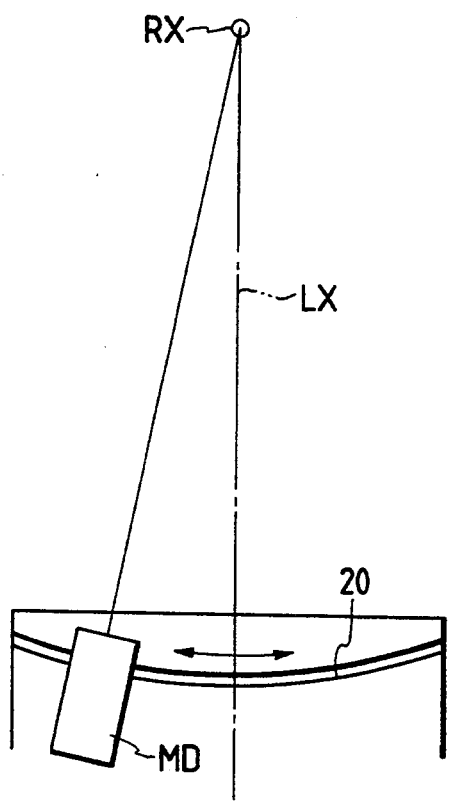
FIG. 10 is a plan view showing a mechanism for directing a focus detection direction of the movable focus detection module toward an area within a predetermined exit pupil area regardless of its height.
Figure 11:
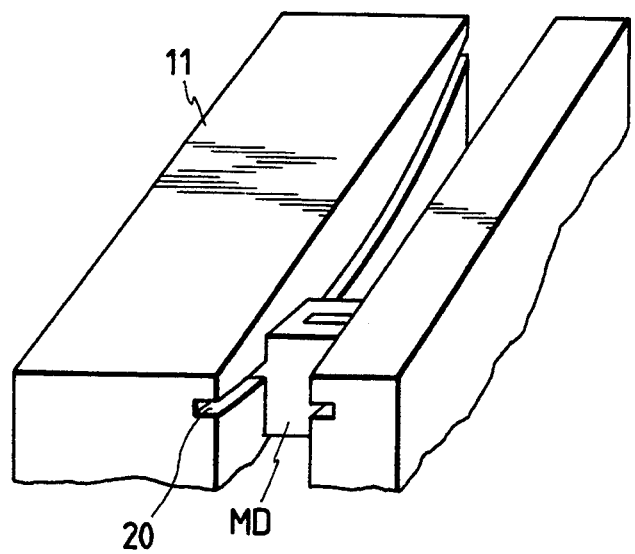
FIG. 11 is a perspective view of the mechanism shown in FIG. 10.

As shown in FIGS. 10 and 11, when a slide groove 20 of the focus detection module MD is formed by a surface having a given curvature so that the focus detection module MD can oppose an area RX in an exit pupil at a predetermined position even when it is separated from the optical axis LX, almost the entire area of the phototaking frame can be subjected to focus detection. The center of curvature of the groove 20 is preferably set to fall within a range of about 70 to 140 mm in front of the focus detection plane in a 35-mm single-lens reflex camera, and more preferably, about 100 mm.

If the direction of the focus detection module can be changed according to the position of a focus detection area like in the embodiment shown in FIG. 10, any focus detection area can be subjected to focus detection using one of the array pairs.

Second Embodiment

A focus detection apparatus according to the second embodiment of the present invention will be described below with reference to FIGS. 12 to 17.

Figure 12:
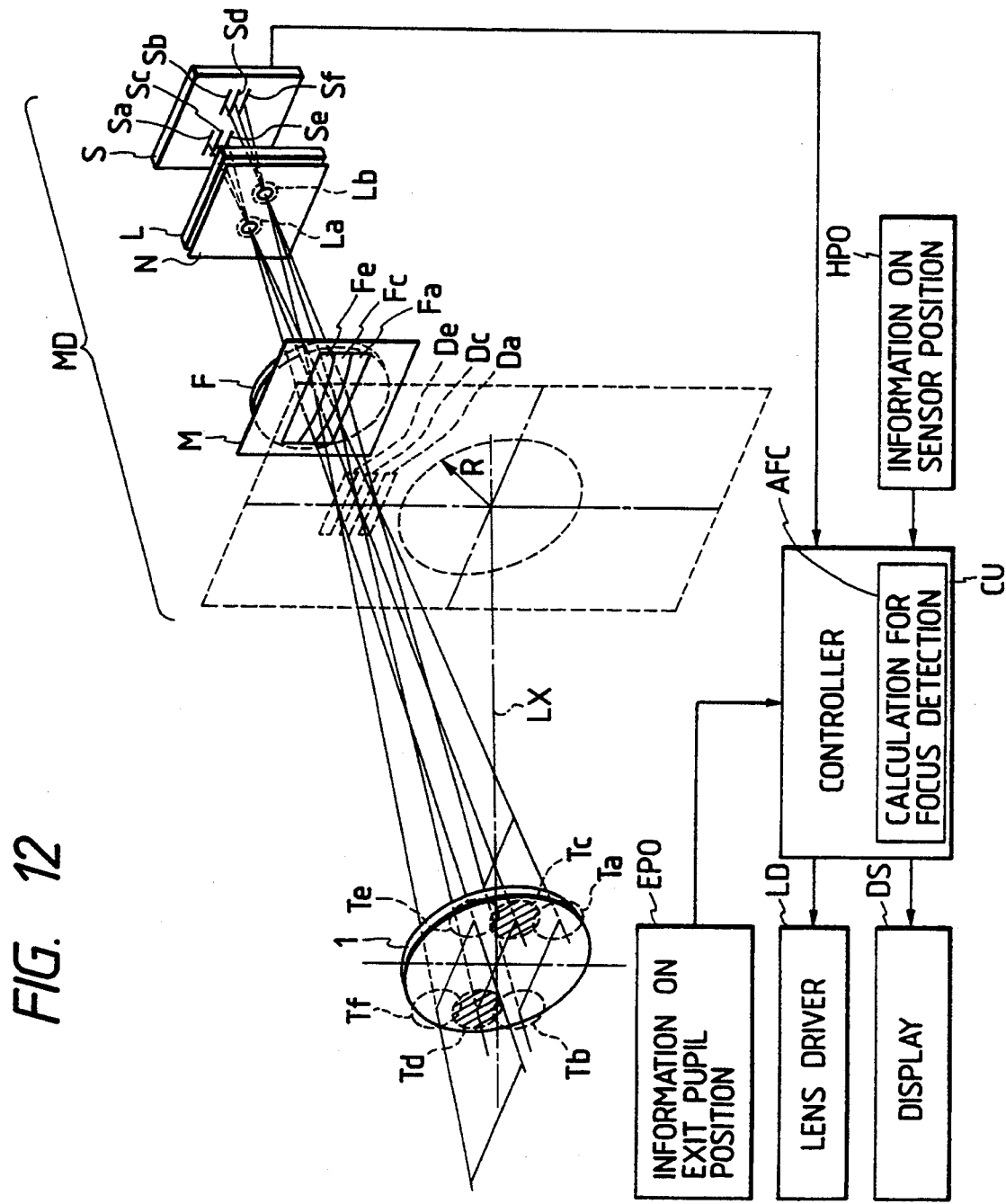
FIG. 12 is a schematic diagram showing the overall structure of the present invention.

FIG. 12 shows the principle of the present invention. A plurality of light components incident through a plurality of areas on an exit pupil of a phototaking lens 1 are respectively focused on a focus detection plane 2, and are then incident on a focus detection module MD (to be described later). The light components are then re-focused on photoelectric transducer arrays of the module MD, thus performing focus detection using the respective light components.

Figure 13:
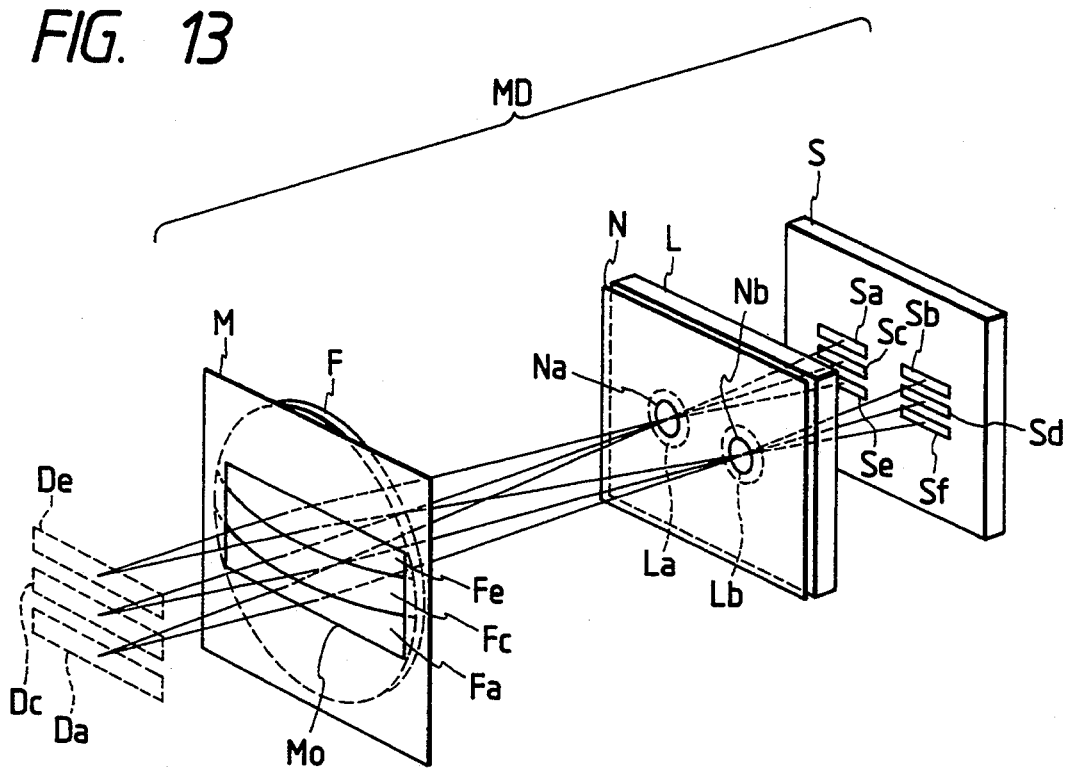
FIG. 13 is a perspective view showing in detail a focus detection module.

As shown in detail in FIG. 13, the focus detection module MD is constituted by an IC board S on which a plurality of photoelectric transducer arrays Sa, Sb, Sc, Sd, Se, and Sf are arranged on a plane conjugate with the focus detection plane 2, a lens board L having re-focusing lenses La and Lb for focusing optical images passing through areas Ta, Tb, Tc, Td, Te, and Tf of the phototaking lens 1 on the corresponding photoelectric transducer arrays, a stop board N arranged in front of the lens board L, and having aperture stops Na and Nb opposing the corresponding re-focusing lenses, a field lens F, having three portions Fa, Fc, and Fe having different optical performances, for focusing conjugate images of the pupil apertures Na and Nb of the re-focusing lenses La and Lb on different exit pupil positions via the areas Ta, Tb, Tc, Td, Te, and Tf, and a field mask M having a rectangular opening MO so as to prevent unnecessary light components from becoming incident on the photoelectric transducer arrays. In FIG. 13, Da, Dc, and De represent focus detection areas on the focus detection plane 2, where the photoelectric transducer array pairs Sa and Sb, Sc and Sd, and Se and Sf are projected by the re-focusing lenses La and Lb and the field lens F to overlap each other.

The field lens F will be described below with reference to FIG. 14.

Figure 14:
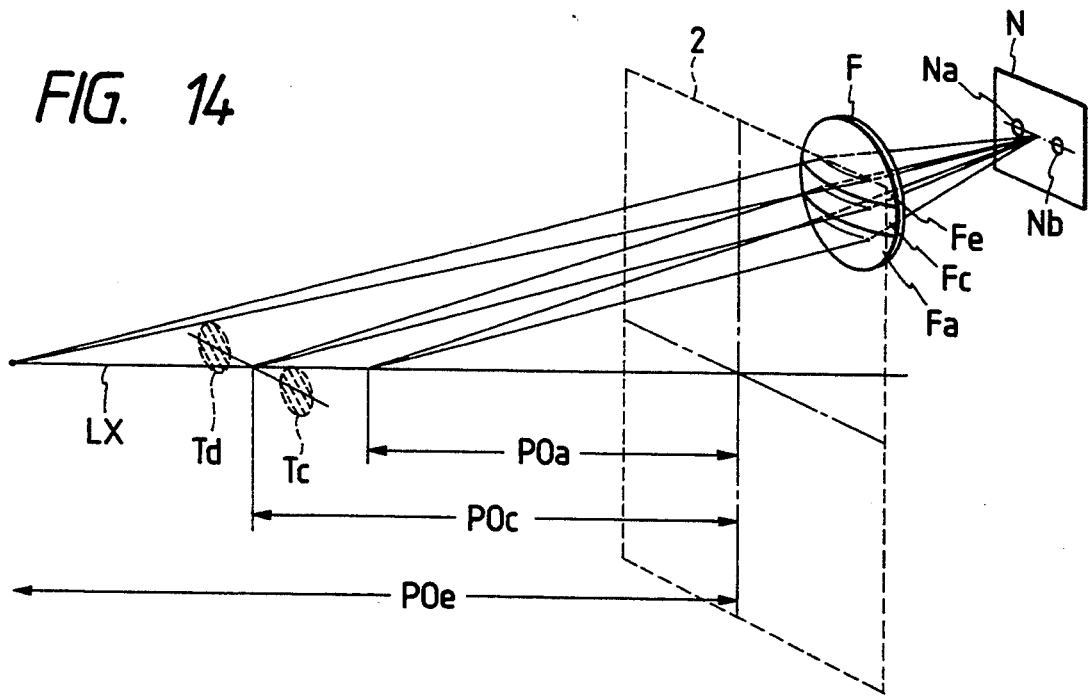
FIG. 14 is an explanatory view of a field lens constituting the focus detection module.
Figure 15A:
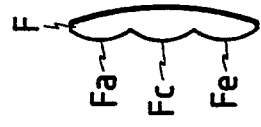
FIGS. 15A and 15B are views showing the shapes of the field lens.
Figure 15B:

As shown in FIG. 14, the three portions Fa, Fc, and Fe of the field lens F have different powers for focusing conjugate images of the pupil apertures Na and Nb of the re-focusing lenses La and Lb on different exit pupil positions POa, POc, and POe, and are formed to have a shape, as shown in FIG. 15A or 15B.

In general, since the exit pupil of an exchangeable lens of a 35-mm single-lens reflex camera is distributed within a range of 50 mm to 300 mm to have 100 mm as the center, the exit pupil positions POa, POc, and POe are respectively set to be about 50 to 85 mm, about 75 to 135 mm, and 120 mm or more. In this case, POa<POc<POe.

The field lens F shown in FIG. 15A has a flat surface on the side far from the phototaking lens, and a portion on the side of the phototaking lens is divided into three portions. The field lens shown in FIG. 15B has a curved surface on the side far from the phototaking lens, and a portion on the side of the phototaking lens is divided into three portions. It is preferable to divide the portion on the side of the phototaking lens in terms of light splitting. The field lens portion Fe farthest from the optical axis forms images of the pupil apertures Na and Nb on the farthest exit pupil as shown in FIG. 14. However, the field lens portion Fe farthest from the optical axis may form images of the pupil apertures Na and Nb on the nearest exit pupil POa. The arrangement shown in FIG. 14 is preferable in optical design.

As can be seen from FIG. 12, light components passing through the areas Ta and Tb set on the lower portion on the exit pupil of the phototaking lens 1 are focused on the photoelectric transducer arrays Sa and Sb by the re-focusing lenses La and Lb via the field lens portion Fa, light components passing through the areas Tc and Td set slightly above the areas Ta and Tb are focused on the photoelectric transducer arrays Sc and Sd by the re-focusing lenses La and Lb via the field lens portion Fc, and light components passing through the areas Te and Tf set slightly above the areas Tc and Td are focused on the photoelectric transducer arrays Se and Sf by the re-focusing lenses La and Lb via the field lens portion Fe. In this specification, pairs of photoelectric transducer arrays Sa and Sb, Sc and Sd, and Se and Sf will be respectively referred to as first to third arrays, and are denoted by reference numerals S1 to S3. The positional relationship of the areas Ta to Tf in FIG. 12 relative to the aperture of the phototaking lens is changed depending on the pupil position of a phototaking lens.

Referring to FIG. 12, a controller CU comprises a CPU, a ROM, a RAM, and other peripheral circuits, and includes a focus detection calculation unit AFC which detects an image shift between the arrays in each photoelectric transducer array pair on the basis of signals from the three photoelectric transducer arrays pairs S1 to S3 so as to obtain a defocus amount from the focus detection plane 2 of the phototaking lens, thereby performing focus detection. A pupil position information generator EPO generates information associated with the exit pupil position of a phototaking lens. The generator EPO generates a value written in advance in a lens ROM in an exchangeable lens in accordance with a focal length, or generates a value according to a focal length which is changed by zooming in a zooming lens. A sensor position information generator HPO generates height information of the focus detection module MD. A phototaking lens driver LD and various displays DS are connected to the controller CU.

For example, when the focus detection apparatus of this embodiment is of a general-purpose type which can be assembled in various cameras having different specifications, the height of the focus detection module MD from the optical axis varies depending on the types of camera. Thus, a correspondence table of exit pupil position ranges which can be subjected to focus detection by the array pairs S1 to S3 in correspondence with the heights of the focus detection module MD is prepared in advance in the ROM, and the height of each camera is input to the controller CU via the sensor position information generator HPO during assembly. When the focus detection module MD is set at a given height, since the exit pupil position ranges of a phototaking lens, which ranges can be subjected to focus detection by the first to third array pairs S1 to S3, are determined accordingly, control is made to select a corresponding condition in accordance with a sensor height signal from the sensor position information generator HPO.

This embodiment will be described in more detail below with reference to FIG. 16.

Figure 16:
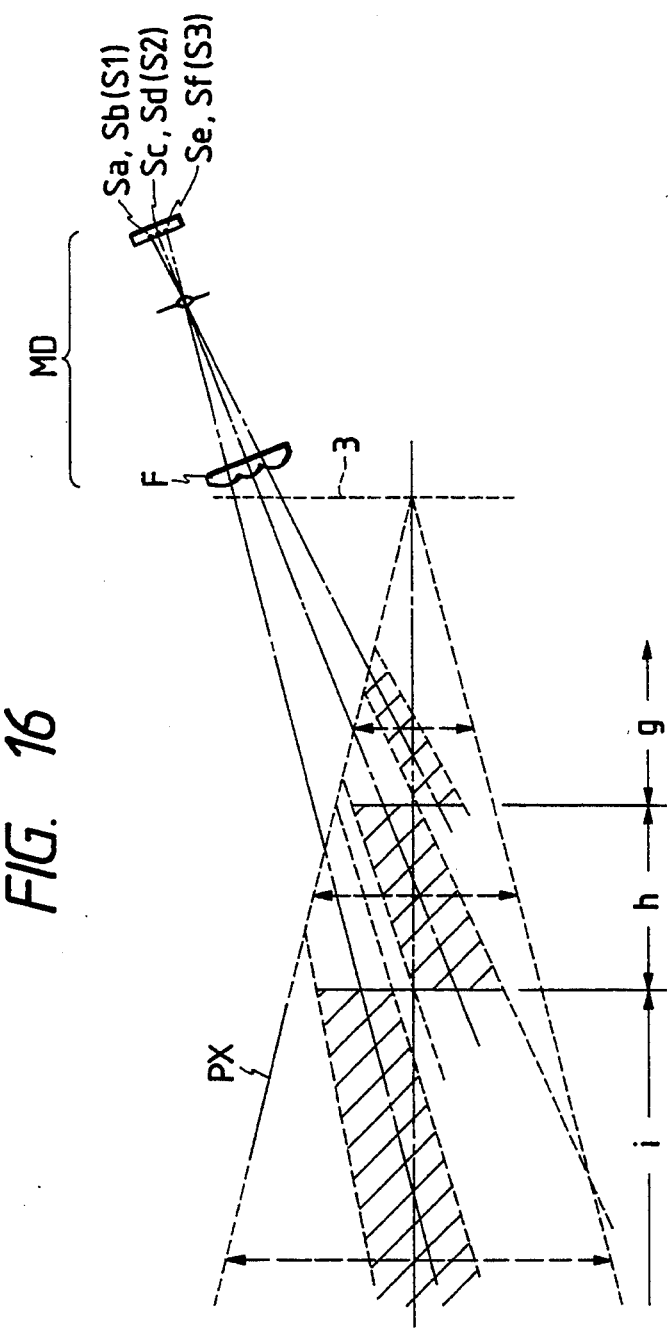
FIG. 16 is a view showing the relationship among exit pupil position ranges which can be subjected to focus detection by first to third photoelectric transducer array pairs.

FIG. 16 shows the exit pupil position ranges in which the three array pairs S1 to S3 can perform focus detection without causing vignetting. In FIG. 16, a spread of light components at the respective exit pupil positions is indicated by PX. Assuming that the focus detection module MD is arranged, as shown in FIG. 16, the first array pair S1 can perform focus detection within an exit pupil position range g without causing vignetting; the second array pair S2, a range h; and the third array pair S3, a range i.

More specifically, when the height of the focus detection module MD is determined, the exit pupil position ranges which allow focus detection by the respective array pairs are determined. Thus, the sensor position information is input to the controller CU via the sensor position information generator HPO to select a correspondence table between the array pairs and the exit pupil positions, and the focus detection module MD can be used as a general-purpose focus detection apparatus.

FIG. 7 which has already been described above can also be applied to the focus detection module MD shown in FIG. 12, and shows an embodiment wherein the focus detection module MD is moved in a direction perpendicular to an image shift detection direction to be able to adjust the height from the optical axis. A drive device SD drives the focus detection module MD. With this device, a photographer can set the focus detection module MD at an arbitrary position. A sensor RE detects the height of the focus detection module MD, and outputs sensor height information.

The apparatus of this embodiment can be used as follows.

A case will be examined below wherein a focus detection area is shifted to an area near the optical axis when the focus detection module is arranged at the height shown in FIG. 16, and focus detection is performed by the first array pair S1 using a phototaking lens whose exit pupil position is present within the range g. When the exit pupil position at which the array pair S1 can perform focus detection without causing vignetting falls outside the range g upon movement of the focus detection module MD, the focus detection is disabled. In this case, the second or third array pair S2 or S3 is automatically selected in accordance with the height of the focus detection module MD and the exit pupil position, and focus detection of an area near the optical axis can be performed without causing vignetting.

The focus detection module of the second embodiment can have the same movable structure as the modules MD1 and MD2 shown in FIGS. 8 and 9 which have already been described above.

The positions of the movable focus detection modules MD1 and MD2 are detected, as shown in FIG. 9. More specifically, a slide resistor 17 extends along the groove 13 (14), and a contact 18 contacting the slide resistor 17 is provided to the module MD1 (MD2). Since the resistance between the end portion of the slide resistor 17 and the contact 18 changes according to the module position, a detection circuit 19 reads a voltage value according to the resistance, thereby detecting the position of the module MD1 (MD2).

Assume that, when focus detection of an area near the optical axis is performed on the basis of signals from the pair of photoelectric transducers of the focus detection module (not shown) arranged in the module mounting portion 11, an operator selects the focus detection module MD1 to perform focus detection of an area outside the optical axis, and sets a focus detection area at an arbitrary desired position. In this case, the detection circuit 19 detects the position of the focus detection module MD1, and the exit pupil position of a phototaking lens is read by the exit pupil position information generator EPO shown in FIG. 12. Based on the position of the focus detection module MD1, an array pair suitable for the read exit pupil position is selected from the three array pairs S1 to S3, and focus detection is performed on the basis of focus detection signals from the selected array pair.

When focus detection using any array pair is disabled, the focus detection module may be moved so that focus detection can be performed by one of the array pairs.

As shown in FIGS. 10 and 11, when a slide groove 20 of the focus detection module MD is formed by a surface having a given curvature so that the focus detection module MD can oppose an area RX in an exit pupil at a predetermined position even when it is separated from the optical axis LX, almost the entire area of the phototaking frame can be subjected to focus detection. The center of curvature of the groove 20 is preferably set to fall within a range of about 70 to 140 mm in front of the focus detection plane in a 35-mm single-lens reflex camera, and more preferably, about 100 mm.

If the direction of the focus detection module can be changed according to the position of a focus detection area like in the embodiment shown in FIGS. 10 and 11, any focus detection area can be subjected to focus detection using one of the array pairs.

Figure 17:
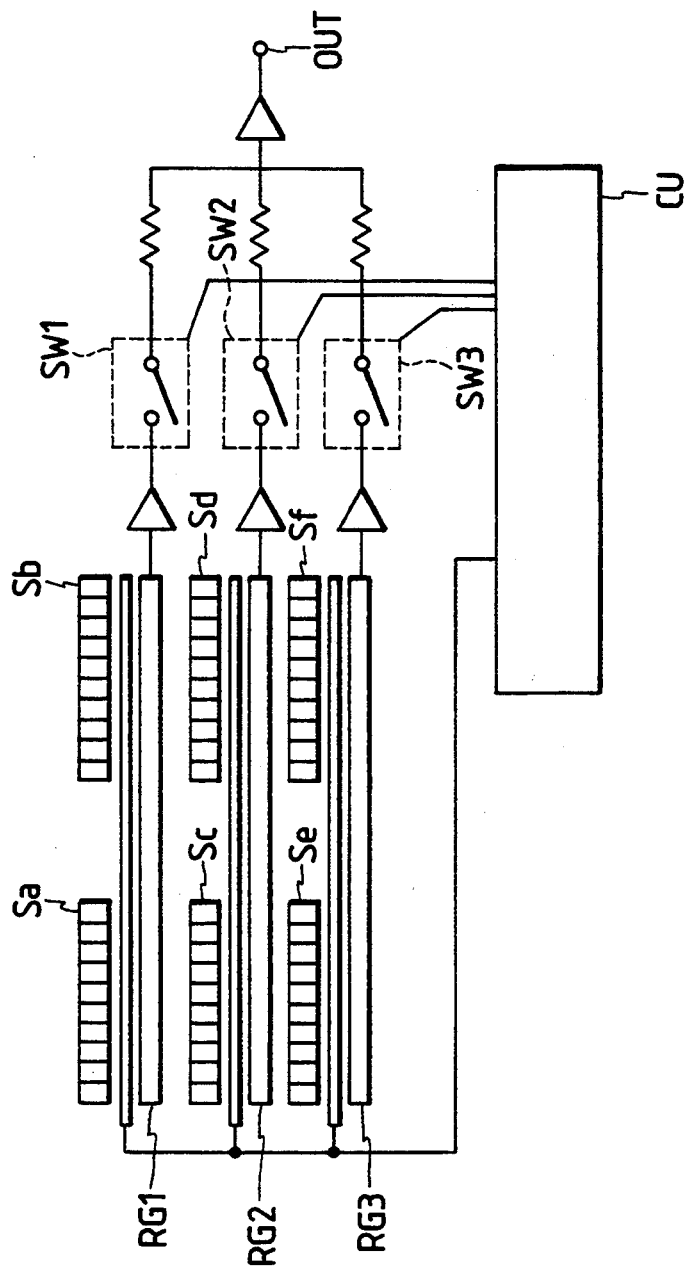
FIG. 17 is a circuit diagram showing a circuit for extracting a focus detection signal from a photoelectric transducer array.

FIG. 17 shows a circuit arrangement for selectively using the three pairs of photoelectric transducer arrays Sa and Sb, Sc and Sd, and Se and Sf. Shift registers RG1 to RG3 are connected to an output terminal OUT via switches SW1 to SW3, respectively. The switches SW1 to SW3 are switched under the control of the controller CU, thus obtaining desired focus detection signals.

In the structure shown in FIG. 12, the focus detection module MD outside the optical axis need not always be movably arranged, but may be fixed. One pair of photoelectric transducers may be selected in accordance with a full-open f-number in place of the exit pupil position. Alternatively, one pair of photoelectric transducers may be selected on the basis of both the exit pupil position and the full-open f-number.

Some bright lenses having a small full-open f-number often have a plurality of focus detection areas outside the optical axis, which areas are free from vignetting. In this case, focus detection calculations can be performed on the basis of focus detection signals from the plurality of areas. Three examples will be described below.

Figure 18:
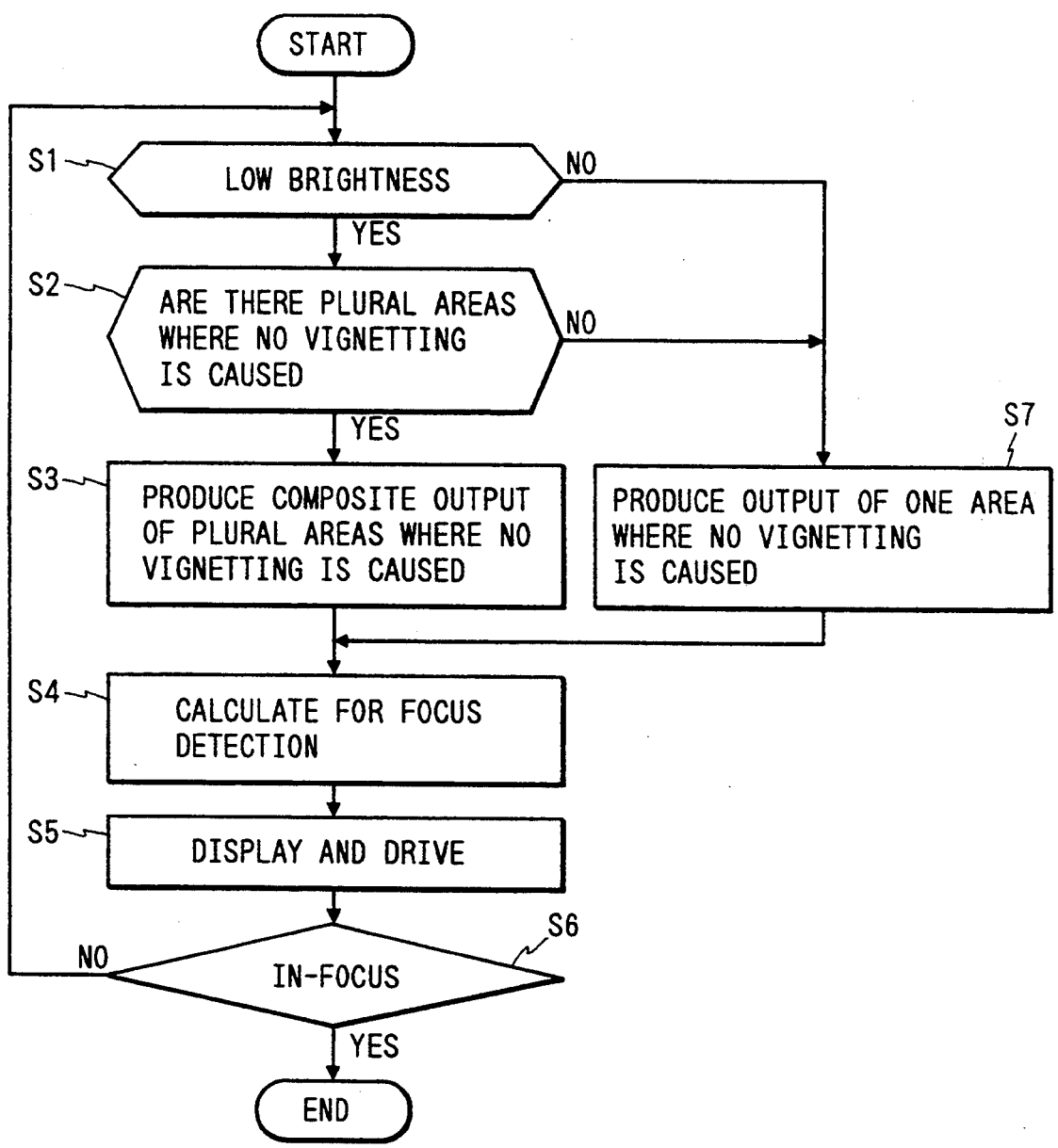
FIG. 18 is a flow chart showing a sequence capable of improving an S/N ratio by mixing a plurality of focus detection signals when focus detection is possible in a plurality of focus detection areas outside the optical axis in a low-brightness state.

(1) An embodiment wherein an S/N ratio in a low-brightness state is increased to improve focus detection precision will be described below with reference to FIG. 18. Note that this program is executed in the controller CU shown in FIG. 12.

It is checked in step S1 if the brightness is low. If Y (YES) in step S1, it is checked in step S2 if there are a plurality of areas free from vignetting. If it is determined that focus detection is enabled in a plurality of areas, the flow advances to step S3 to mix focus detection signals from a plurality of array pairs free from vignetting. This mixing operation can be attained by closing at least two of the above-mentioned switches SW1 to SW3. In this case, a signal output from the output terminal OUT is a composite signal. In step S4, a defocus calculation is executed on the basis of the composite signal. In step S5, the focus detection result is displayed, and a lens is driven. In step S6, it is checked if an in-focus state is attained. If N (NO) in step S6, the flow returns to step S1, and the above-mentioned sequence is executed again. If the brightness is not low, or if the number of areas free from vignetting is one, the flow advances to step S7, and a defocus calculation is executed on the basis of focus detection signals from the array pair corresponding to the area free from vignetting.

In this manner, since focus detection signals corresponding to a plurality of areas free from vignetting are mixed, and a composite signal is used in a defocus calculation, an S/N ratio in the low-brightness state can be increased, and focus detection calculation precision can be improved.

(2) An embodiment wherein priorities are given to a plurality of focus detection areas to perform a more proper focus detection calculation will be described below with reference to FIG. 19.

It is checked in step S11 if there are a plurality of focus detection areas free from vignetting. If Y in step S11, the flow advances to step S12. In step S12, focus detection signals are processed in turn in a predetermined priority order, and a focus detection calculation is ended when one focus detection calculation result is obtained. If the number of focus detection areas free from vignetting is only one, the flow advances to step S13, and a focus detection calculation is executed on the basis of focus detection signals from the focus detection area. It is checked in step S14 on the basis of the obtained defocus amount if focus detection is enabled. If Y in step S14, a lens drive operation and an in-focus display are made on the basis of the focus detection calculation result in step S15. However, if N in step S14, the flow advances to step S16, and the phototaking lens is scanned to store new charges on the photoelectric transducer arrays. The flow then returns to step S11, and the above-mentioned steps are repeated.

(3) The algorithm (2) may be modified as follows.

Figure 19:
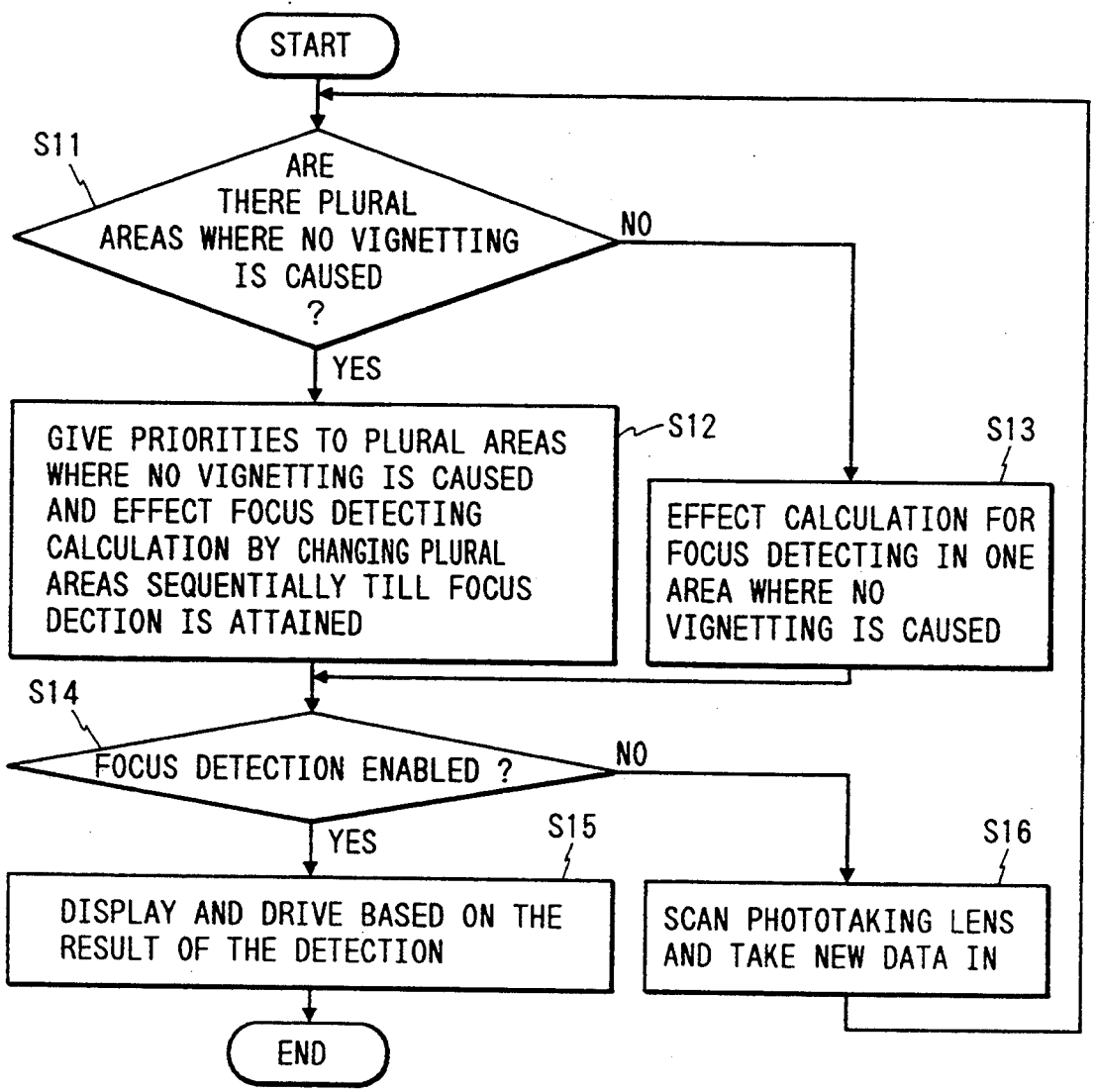
FIG. 19 is a flow chart showing a modification of the sequence shown in FIG. 18.
Figure 20:
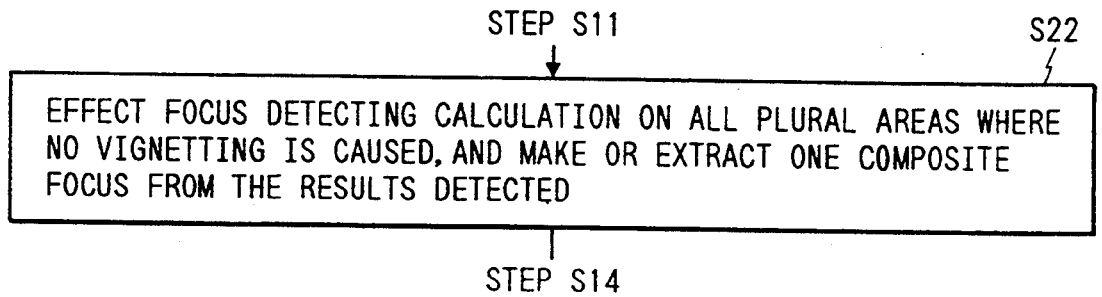
FIG. 20 is a flow chart showing another modification of the sequence shown in FIG. 18.

Step S12 in FIG. 19 may be replaced with step S22 shown in FIG. 20. More specifically, if there are a plurality of focus detection areas free from vignetting, focus detection calculations are executed on the basis of all the focus detection signals, and one focus detection result is extracted by a predetermined selection algorithm. In this case, a plurality of focus detection results may be mixed to obtain an optimal focus detection result in place of selecting one of the plurality of focus detection results.

Third Embodiment

Figure 21:
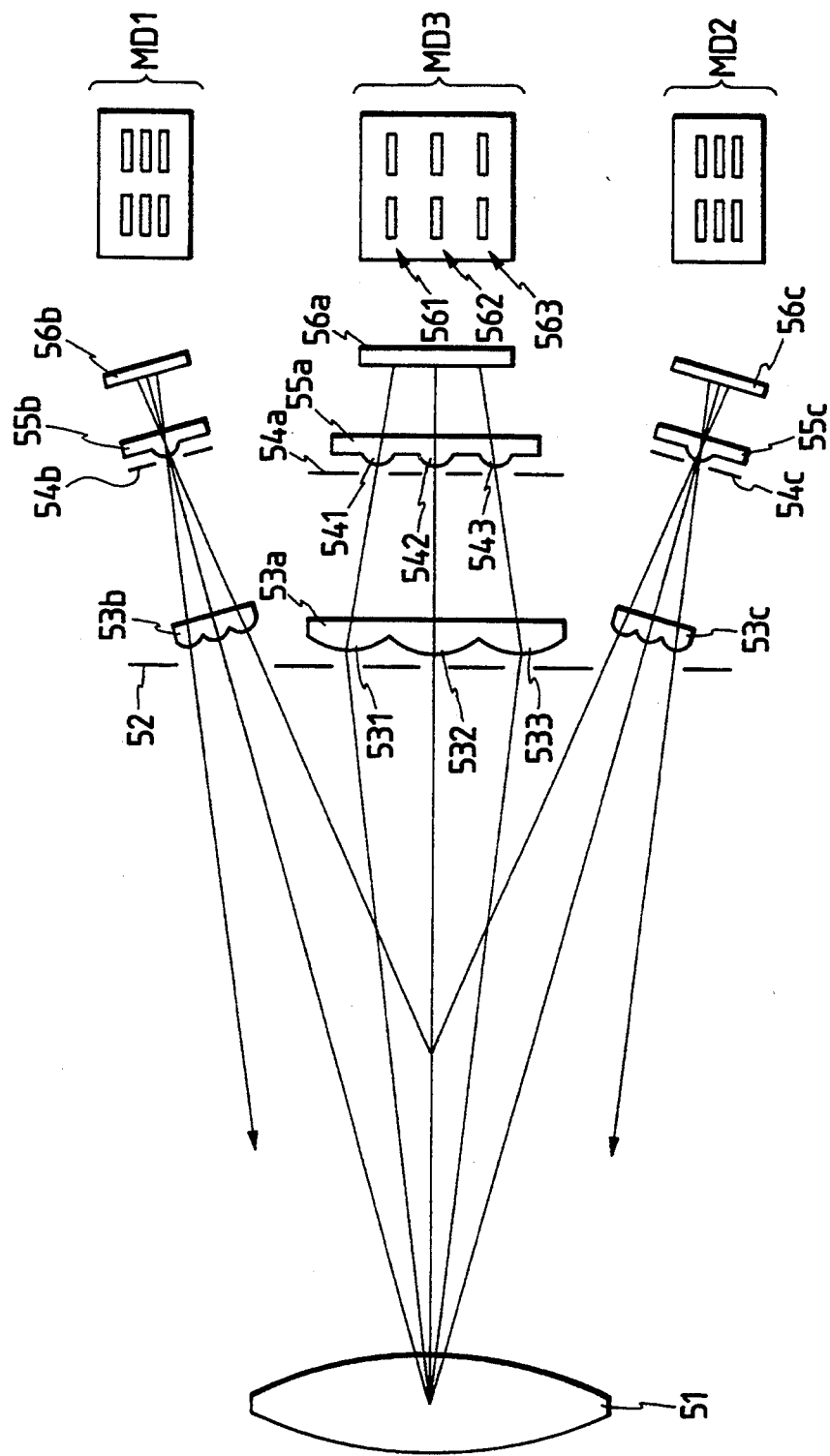
FIG. 21 is a view showing an embodiment wherein a plurality of focus detection areas shown in FIG. 12 are set outside the optical axis, and another plurality of focus detection areas are also set near the optical axis.

FIG. 21 shows a focus detection apparatus in which focus detection near the optical axis is performed by a focus detection module MD3 with reference to a plurality of focus detection areas, and focus detection outside the optical axis is performed by focus detection modules MD1 and MD2 having the arrangement like in the second embodiment.

In FIG. 21, the apparatus includes a phototaking lens 51, a field mask 52, a field lens 53a used in focus detection near the optical axis, field lenses 53b and 53c used in focus detection outside the optical axis, an aperture stop 54a used in focus detection near the optical axis, aperture stops 54b and 54c used in focus detection outside the optical axis, a re-focusing lens 55a near the optical axis, re-focusing lenses 55b and 55c outside the optical axis, a sensor board 56a used in focus detection near the optical axis, and sensor boards 56b and 56c used in focus detection outside the optical axis.

The field lens 53a used in focus detection near the optical axis comprises portions 531, 532, and 533 having different optical performances, and the re-focusing lens 55a used in focus detection near the optical axis comprises re-focusing lenses 551, 552, and 553. Furthermore, three pairs of photoelectric transducer arrays 561, 562, and 563 are arranged on the sensor board 56a. Light components passing through a pair of focus detection areas set near the optical axis of the phototaking lens 51 are focused on the three pairs of photoelectric transducer arrays 561, 562, and 563 via the field lenses 531, 532, and 533, and the re-focusing lenses 551, 552, and 553.

Figure 22A:
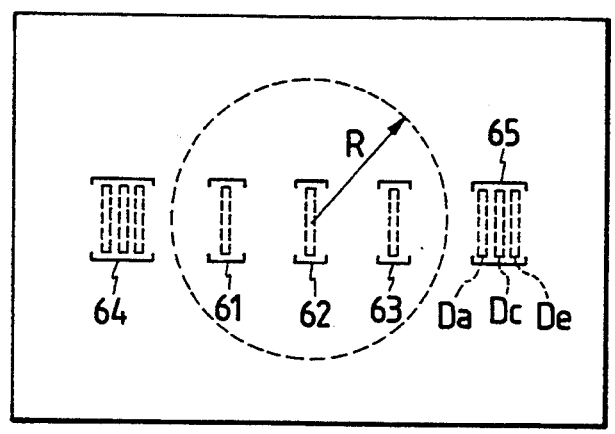
FIGS. 22A and 22B show display examples in a phototaking frame of the embodiment shown in FIG. 21.
Figure 22B:
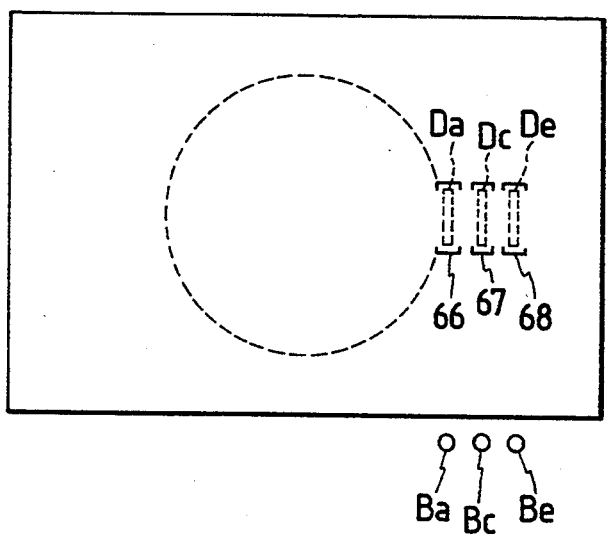

In a finder of a camera comprising the above-mentioned focus detection apparatus, focus detection areas 61, 62, 63, 64, and 65 are displayed, as shown in FIG. 22A. The focus detection areas 61 to 63 are those near the optical axis set within a dotted circle of radius R, and the focus detection areas 64 and 65 are those outside the optical axis. The radius of the focus detection areas near the optical axis is set to be 7 mm to 12 mm. Note that Da, Dc, and De represent focus detection areas shown in FIG. 13. When the focus detection areas Da, Dc, and De outside the optical axis are intentionally arranged to be separated from each other, focus detection areas 66 to 68 may be individually displayed, as shown in FIG. 22B. In this case, indicators Ba, Bc, and Be indicating the selected areas may be arranged outside the finder frame. In a bright lens having a small full-open f-number, it is preferable that the intervals between the focus detection areas Da, Dc, and De are positively increased to increase the number of alternative focus detection areas.

The focus detection apparatus described above has the following merits.

Figure 23:
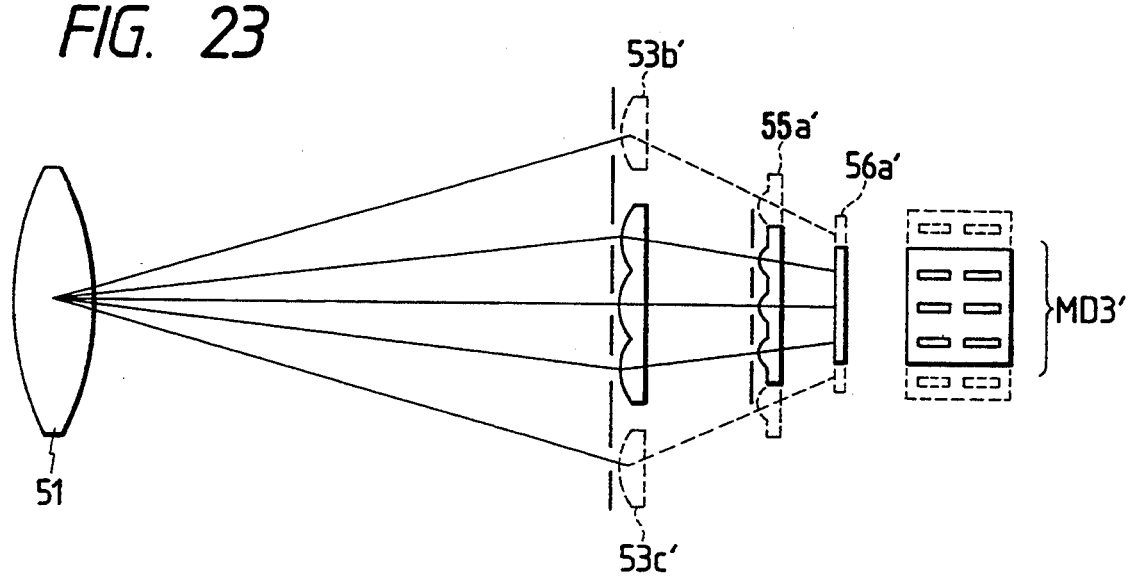
FIG. 23 is a view for explaining the effect of the embodiment shown in FIG. 21.

When the three focus detection areas 61 to 63 are set near the optical axis, and the two focus detection areas 64 and 65 are set outside the optical axis, as shown in FIG. 21, if the re-focusing lens near the optical axis is simply extended, as shown by refocusing lens 55a' in FIG. 23, and if the sensor board near the optical axis is simply extended so as to integrally include photoelectric transducer arrays used in focus detection outside the optical axis, as shown by sensor board 56a' and module MD3' in FIG. 23, the size of the board is undesirably increased, resulting in an increase in cost. Furthermore, when the optical performances of field lenses 53b' and 53c' used in focus detection outside the optical axis are set, as indicated by broken lines in FIG. 23, this arrangement is optically not desirable. Focus detection of focus detection areas outside the optical axis may be disabled depending on the exit pupil position of a phototaking lens. Thus, when the arrangement shown in FIG.

21 is adopted, the sensor board can be prevented from being increased in size, and an increase in cost can be minimized. In addition, the field lenses used in focus detection outside the optical axis can have good optical performances. Furthermore, even when the exit pupil position of a phototaking lens is varied, focus detection outside the optical axis is enabled over a wide range.

Fourth Embodiment

Figure 24:
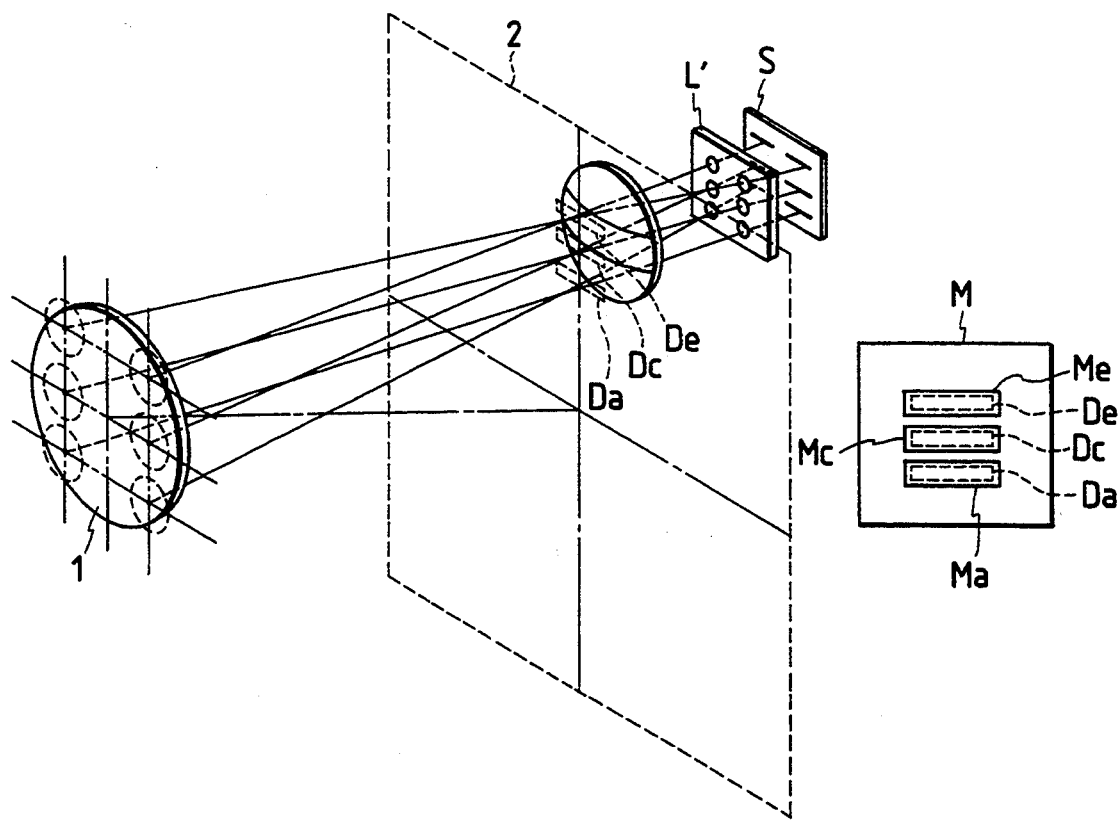
FIG. 24 is a perspective view showing a modification of the focus detection apparatus for focus detection areas outside the optical axis according to the embodiment shown in FIG. 21.
Figure 25:
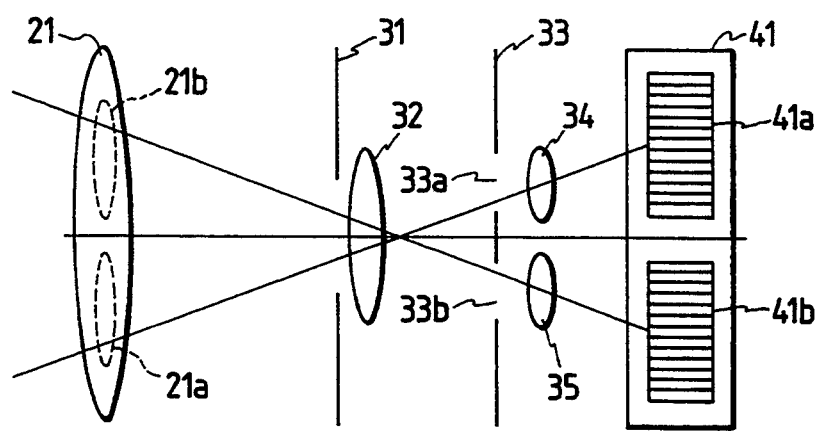
FIG. 25 is a view for explaining a conventional phase difference type focus detection optical system.

The focus detection apparatus outside the optical axis of the third embodiment can be modified, as shown in FIG. 24.

In the arrangement shown in FIG. 24, three pairs of re-focusing lenses are provided according to a plurality of focus detection areas in the arrangement of the second embodiment. In this case, openings Ma, Mc, and Me corresponding to three focus detection areas are formed in the field mask M. Other parts are the same as those in the second embodiment.

The arrangement shown in FIG. 24 has the following merits.

When the intervals between focus detection areas Da, Dc, and De outside the optical axis are increased (e.g., by 1 to 2 mm), the optical aberration performance can be improved as compared to a case wherein a pair of re-focusing lens are provided, as shown in FIG. 12.

On the other hand, the arrangement shown in FIGS. 12 and 13 has the following merits as compared to FIG. 24.

In FIG. 13, the positions of the three pairs of arrays arranged on the sensor board S are aligned on the order of submicrons. Therefore, when the positions of the re-focusing lens board L and the sensor board S are adjusted so that an image formed on the photoelectric transducer array Sc by the re-focusing lens La, and an image formed on the photoelectric transducer array Sd by the re-focusing lens Lb overlap each other strictly (in particular, in a direction perpendicular to a pixel aligning direction) on the focus detection area Dc on the focus detection plane 2, an image formed on the photoelectric transducer array Sa by the re-focusing lens La, and an image formed on the photoelectric transducer array Sb by the re-focusing lens Lb coincide with each other on the focus detection area Da on the focus detection plane 2, and an image formed on the photoelectric transducer array Se by the re-focusing lens La, and an image formed on the photoelectric transducer array Sf by the re-focusing lens Lb coincide with each other on the focus detection area De on the focus detection plane 2.

In contrast to this, in the arrangement of the focus detection apparatus shown in FIG. 24, since the three pairs of re-focusing lenses are formed by molding on a single plastic substrate L', the lens positions cannot be determined on the order of submicrons, and an aligning operation is not easy.

The focus detection module MD in the first embodiment shown in FIG. 1 is constituted by the IC board S on which the plurality of photoelectric transducer arrays Sa, Sb, Sc, Sd, Se, and Sf are arranged on a plane conjugate with the focus detection plane 2, the lens board L having the re-focusing lenses La, Lb, Lc, Ld, Le, and Lf for focusing optical images passing through areas Ta, Tb, Tc, Td, Te, and Tf of the phototaking lens 1 on the corresponding photoelectric transducer arrays, the stop board (not shown) arranged in front of the lens board L, and having aperture stops opposing the corresponding re-focusing lenses, a field lens F for projecting optical images formed on the focus detection plane 2 via the respective areas of the phototaking lens 1 onto the photoelectric transducer arrays via the corresponding re-focusing lenses, and a field mask (not shown) having a rectangular opening so as to prevent unnecessary light components from becoming incident on the photoelectric transducer arrays. In FIG. 1, a focus detection area on the focus detection plane 2 is indicated by D, and different exit pupil positions are indicated by PO1 and PO2.

As can be seen from FIG. 1, light components passing through the areas Ta and Tb set on the lower portion of the phototaking lens 1 are focused on the photoelectric transducer arrays Sa and Sb by the re-focusing lenses La and Lb, light components passing through the areas Tc and Td set slightly above the areas Ta and Tb are focused on the photoelectric transducer arrays Sc and Sd by the re-focusing lenses Lc and Ld, and light components passing through the areas Te and Tf set slightly above the areas Tc and Td are focused on the photoelectric transducer arrays Se and Sf by the re-focusing lenses Le and Lf. In the optical system shown in FIG. 1, since the three pairs of photoelectric transducer arrays are directed toward substantially the same detection area D, the same detection area can be subjected to detection using other pairs of transducer arrays. However, when a bright lens having a small full-open f-number is used, and when all the photoelectric transducer pairs are free from vignetting, the number of detection areas cannot be increased. That is, the arrangements shown in FIGS. 1, 12, and 24 respectively have merits and demerits, and are selectively used according to applications.

What is claimed is:

1. A focus detection apparatus comprising photoelectric transducer array means and re-focusing optical means for refocusing light flux from a focus detection region of an object to be photographed through a phototaking lens, characterized in that:
   said re-focusing optical means includes a plurality of paired re-focusing optical systems for re-focusing light fluxes from only a single and same focus detection region; and
   said photoelectric transducer array means includes a plurality of paired photoelectric transducer arrays corresponding to said plurality of paired re-focusing optical systems.

2. A focus detection apparatus according to claim 1, wherein said plurality of paired photoelectric transducer arrays are disposed at a position distant from the optical axis of said phototaking lens.

3. A focus detection apparatus according to claim 2, wherein at least one pair of said paired photoelectric transducer arrays is selected based on the height of said plurality of paired photoelectric transducer arrays from said optical axis and on the position of an exit pupil of said phototaking lens, and calculation of focus detection is effected with use of information from said selected photoelectric transducer arrays.

4. A focus detection apparatus according to claim 1, wherein said plurality of paired photoelectric transducer arrays are arranged in parallel.

5. A focus detection apparatus according to claim 1, wherein a single aperture stop is provided in the neighborhood of the expected focal plane of said phototaking lens.

6. A focus detection apparatus comprising:
   a plurality of paired photoelectric transducer arrays;

only a single pair of re-focusing optical systems for re-focusing light fluxes from a plurality of focusing detection regions of a field to be photographed, through a phototaking lens; and a field lens group disposed in the neighborhood of an expected focal plane of said phototaking lens and including a plurality of field lenses corresponding to said plurality of focus detection regions and through which the respective light fluxes are guided to said plurality of paired photoelectric transducer arrays;

said plurality of field lenses being so arranged that light fluxes from said plurality of focus detection regions may be guided to said pair of re-focusing optical systems across different positions on an optical axis of said phototaking lens.

7. A focus detection apparatus according to claim 6, wherein said plurality of paired photoelectric transducer arrays are disposed at a position distant from the optical axis of said phototaking lens.

8. A focus detection apparatus according to claim 7, wherein said plurality of field lenses have powers respectively corresponding to different exit pupil positions of said phototaking lens.

9. A focus detection apparatus according to claim 7, wherein at least one pair of said paired photoelectric transducer arrays are selected based on the height of said plurality of paired of photoelectric transducer arrays and on an exit pupil position of said phototaking lens and calculation of focus detection is effected with use of information from the selected photoelectric transducer arrays.

10. A focus detection apparatus according to claim 7, wherein each of said field lenses has a face which is flat or which has a same continuous curvature.

11. A focus detection apparatus having at least a pair of photoelectric transducer arrays, a focus detection module provided with at least a pair of re-focusing optical systems for re-focusing light flux from a focus detection region of an object field onto said pair of photoelectric transducer arrays through a phototaking lens, drive means for moving said focus detection module, and position detecting means for detecting position to which said focus detection module has moved.

12. A focus detection apparatus according to claim 11, wherein said drive means moves said focus detection module to a position which a photographer desires.

13. A focus detection apparatus according to claim 11, wherein said focus detection module has plural pairs of said photoelectric transducer arrays, and wherein on the basis of position of said focus detection module and exit pupil position of said phototaking lens, at least one pair of said photoelectric transducer arrays is selected and calculation for focus detection is effected with use of information from the selected photoelectric transducer arrays.

14. A focus detection apparatus comprising photoelectric transducer array means and re-focusing optical means for re-focusing light flux from a focus detection region of an object to be photographed through a phototaking lens, characterized in that:

said re-focusing optical means includes a plurality paired re-focusing optical systems for re-focusing light fluxes from substantially overlapping focus detection regions; and said photoelectric transducer array means includes a plurality of paired photoelectric transducer arrays corresponding to said plurality of paired re-focusing optical systems.

15. A focus detection apparatus comprising:

a focus detection module provided with at least a pair of photoelectric transducer arrays and at least a pair of re-focusing optical systems, wherein said focus detection module is arranged to detect focus conditions on the basis of an output of said photoelectric transducer arrays which receive light flux re-focused by said re-focusing optical system from a focus detection region of an object field through a phototaking lens; and a driving device coupled to said focus detection module, wherein said driving device is arranged to move said focus detection module and to change the direction of impinging light flux on said photoelectric transducer arrays used for focus detection according to the movement of said focus detection module.

16. A focus detection apparatus comprising:

a focus detection module provided with at least a pair of photoelectric transducer arrays and at least a pair of re-focusing optical systems, wherein said focus detection module is arranged to detect focus conditions on the basis of an output of said photoelectric transducer arrays which receive light flux re-focused by said re-focusing optical systems from a focus detection region of an object field through a phototaking lens;

a control system including a driving control portion and a changing control portion, wherein said driving control portion is coupled to said focus detection module so as to move said focus detection module, and said changing control portion changes said pair of photoelectric transducer arrays so as to change the direction of impinging light flux on said photoelectric transducer arrays used for focus detection according to the movement of said focus detection module.

17. A focus detection apparatus comprising:

a focus detection module provided with at least a pair of photoelectric transducer arrays and at least a pair of re-focusing optical systems, wherein said focus detection module is arranged to detect focus conditions on the basis of an output of said photoelectric transducer arrays which receive light flux re-focused by said re-focusing optical systems from a focus detection region of an object field through a phototaking lens; and a driving device coupled to said focus detection module, wherein said driving device is arranged to move said focus detection module and to change the direction of said focus detection module so as to change the direction of impinging light flux on said photoelectric transducer arrays used for focus detection according to the movement of said focus detection module.

18. A focus detection apparatus according to claim 17, wherein said driving device has a slide-groove for guiding said focus detection module non-linearly.

19. A focus detection apparatus comprising:

focus detection modules provided with at least a pair of photoelectric transducer arrays and at least a pair of re-focusing optical systems, wherein said focus detection modules are arranged to detect focus conditions on the basis of an output of said photoelectric transducer arrays which receive light flux re-focused by said re-focusing optical systems from a focus detection region of an object field through a phototaking lens; and one of said focus detection modules being fixed in the neighborhood of an optical axis of said phototaking lens, and another focus detection module being located off of the optical axis of said phototaking lens and being movable.

20. A focus detection apparatus according to claim 19, wherein a position to which said other focus detection module is moved is settable by a photographer.

21. A focus detection apparatus provided with a photoelectric transducer device and a re-focusing optical system which refocuses light flux from a focus detection region of an object to be photographed through a phototaking lens, wherein:

said re-focusing optical system includes a plurality of paired re-focusing optical lenses which re-focus light fluxes from overlapping focus detection regions, respectively; and said photoelectric transducer device includes a plurality of paired photoelectric transducer arrays corresponding to said plurality of paired re-focusing optical lenses.

* * * * *